United States Patent
Frediani et al.

(10) Patent No.: US 8,967,734 B2
(45) Date of Patent: Mar. 3, 2015

(54) ELECTRONICALLY CONTROLLED BRAKE SYSTEM FOR TRAILER TRACTORS

(75) Inventors: Salvatore Frediani, Aosta (IT); Enrico Sedoni, Modena (IT); Francesco Canuto, Turin (IT)

(73) Assignee: CNH Industrial America LLC, New Holland, PA (US)

( * ) Notice: Subject to any disclaimer, the term of this patent is extended or adjusted under 35 U.S.C. 154(b) by 673 days.

(21) Appl. No.: 12/918,712

(22) PCT Filed: Feb. 11, 2009

(86) PCT No.: PCT/EP2009/051586
§ 371 (c)(1),
(2), (4) Date: Nov. 12, 2010

(87) PCT Pub. No.: WO2009/103645
PCT Pub. Date: Aug. 27, 2009

(65) Prior Publication Data
US 2011/0057507 A1 Mar. 10, 2011

(30) Foreign Application Priority Data

Feb. 21, 2008 (EP) ..................................... 08425107

(51) Int. Cl.
*B60T 13/68* (2006.01)
*B60T 13/40* (2006.01)
*B60T 8/176* (2006.01)
*B60T 11/21* (2006.01)
*B60T 8/17* (2006.01)

(52) U.S. Cl.
CPC ............... *B60T 11/21* (2013.01); *B60T 8/1708* (2013.01)

USPC ............................. 303/9.62; 303/123; 303/20

(58) Field of Classification Search
USPC ....................... 303/9.62, 123, 3, 20, 131, 140; 188/355, 106 F; 267/64.17; 701/70, 71
See application file for complete search history.

(56) References Cited

U.S. PATENT DOCUMENTS

| 2,429,197 | A | * | 10/1947 | Price | 303/7 |
| 2,873,148 | A | * | 2/1959 | Schock | 303/63 |
| 3,379,430 | A | * | 4/1968 | Hennells | 267/64.25 |
| 4,029,306 | A | * | 6/1977 | Sakaguchi et al. | 267/116 |
| 4,438,909 | A | * | 3/1984 | Matsumoto | 267/64.26 |
| 5,404,972 | A | * | 4/1995 | Popjoy et al. | 188/277 |
| 5,456,480 | A | * | 10/1995 | Turner et al. | 280/276 |
| 6,272,417 | B1 | * | 8/2001 | Ross et al. | 701/71 |
| 6,296,092 | B1 | * | 10/2001 | Marking et al. | 188/315 |
| 6,758,536 | B2 | * | 7/2004 | Jacob | 303/7 |
| 2007/0260385 | A1 | * | 11/2007 | Tandy et al. | 701/70 |

FOREIGN PATENT DOCUMENTS

JP 2000043694 A * 2/2000 ............... B60T 8/24

* cited by examiner

*Primary Examiner* — Anna Momper
*Assistant Examiner* — San Aung
(74) *Attorney, Agent, or Firm* — Sue C. Watson

(57) ABSTRACT

An electronically controlled brake system for trailer tractors. The system having a device for braking the tractor and trailer, and for steer-by-braking the tractor only, tractor brakes, and further devices for braking the trailer only. The further devices include a normally-ON valve allowing simultaneous braking of the tractor and trailer. The valve is switched to OFF when the steer-by-braking function is activated.

13 Claims, 1 Drawing Sheet

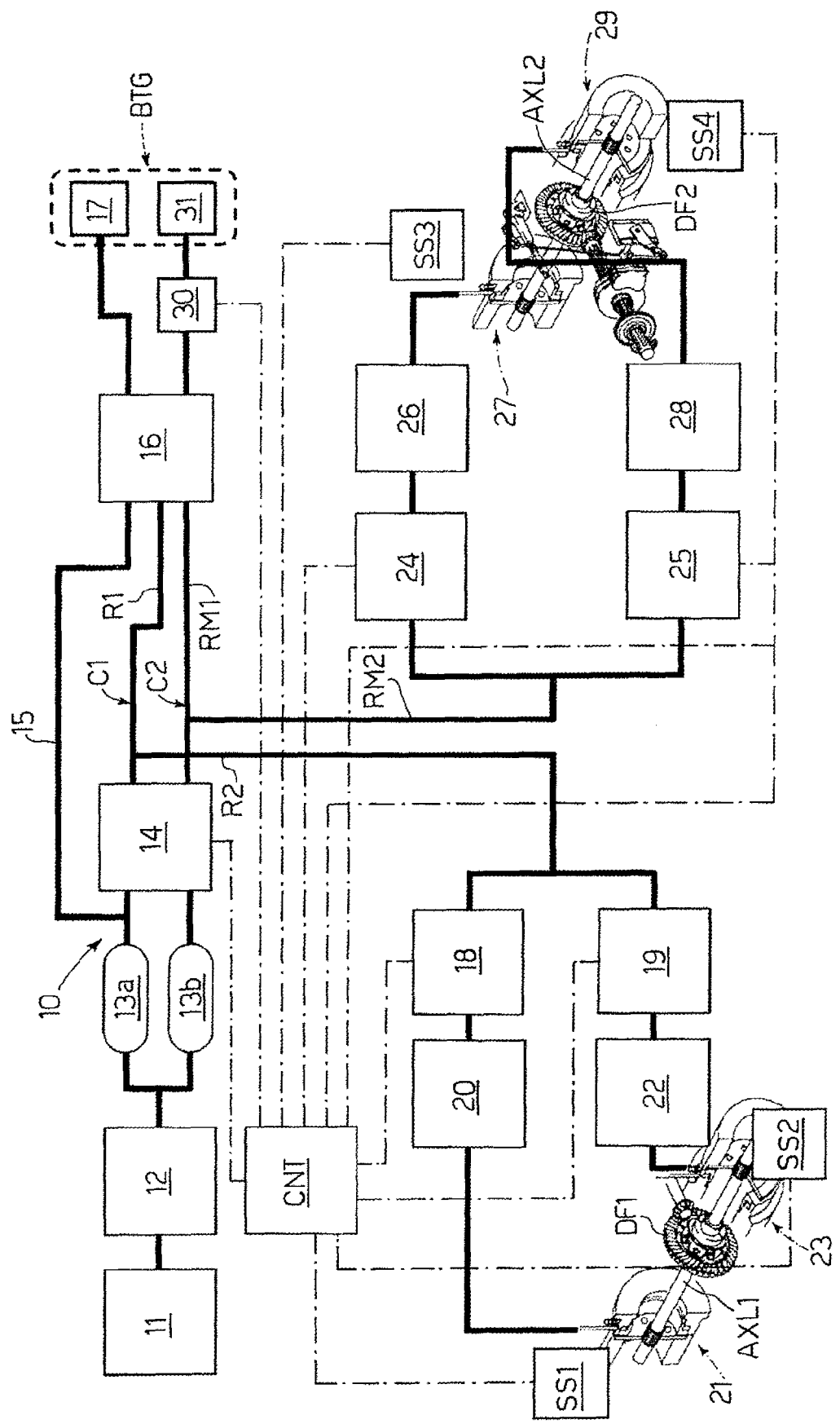

ELECTRONICALLY CONTROLLED BRAKE SYSTEM FOR TRAILER TRACTORS

The present invention relates to an electronically controlled brake system for trailer tractors.

A major problem of trailer tractors with a steer-by-braking function (SBF) is preventing the trailer from braking, and therefore swerving of the tractor/trailer as a whole, when the (SBF) function is activated (i.e. by the driver to steer the tractor to the right or left).

The present invention relates to an electronically controlled brake system designed to solve the above problem.

A non-limiting embodiment of the present invention will be described by way of example with reference to the attached drawing.

Number 10 in the attached drawing indicates as a whole an electronically controlled brake system, in particular for tractors, in accordance with the present invention.

System 10 comprises a compressor 11 for supplying compressed air to an air-processing—substantially air-dehumidifying—unit 12.

The processed air is stored in two parallel tanks 13a, 13b, both connected pneumatically to a pedal arrangement 14 which provides for both normal braking and steer-by-braking (SBF) of the tractor.

As is known, with this type of pedal arrangement 14, when the driver presses the left (or right) pedal only, the brake system only brakes the rear left (or right) wheel, thus reducing the turn radius of the tractor, especially during headland manoeuvres.

A circuit 15 is connected to tank 13a to feed high-pressure (e.g. 8-bar) air to a brake valve 16 of a trailer (not shown) and to a high-pressure coupling 17 forming part of an assembly BTG for pneumatic connection to the trailer brake system (not shown).

As shown in the attached drawing, a first adjustable low-pressure air circuit C1 and a second adjustable low-pressure air circuit C2 originate from pedal arrangement 14.

First circuit C1 comprises two branches R1, R2, of which a first branch R1 connects pedal arrangement 14 pneumatically to the trailer brake valve 16, and a second branch R2 connects pedal arrangement 14 pneumatically to two front ABS modulators 18, 19.

ABS modulator 18 regulates compressed-air supply to a corresponding pneumatic/hydraulic converter 20, which converts the incoming energy, in the form of compressed air, to hydraulic energy to power a corresponding front right brake 21 of a front right wheel (not shown) fitted to an axle AXL1 with a conventional differential DF1.

Likewise, ABS modulator 19 regulates compressed-air supply to a corresponding pneumatic/hydraulic converter 22, which converts the incoming energy, in the form of compressed air, to hydraulic energy to power a corresponding front left brake 23 of a front left wheel (not shown) also fitted to axle AXL1.

A speed sensor SS1 and speed sensor SS2 are provided for determining the speed of the front right wheel and front left wheel respectively.

ABS modulators 18, 19 and front-wheel speed sensors SS1, SS2 are connected electrically to an electronic central control unit CNT for the reasons explained below.

Second circuit C2 comprises two branches RM1 and RM2. Like branch R1 of circuit C1, a first branch RM1 connects pedal arrangement 14 pneumatically to valve 16; and the second branch connects pedal arrangement 14 pneumatically to two rear ABS modulators 24, 25.

ABS modulator 24 regulates compressed-air supply to a corresponding pneumatic/hydraulic converter 26, which converts the incoming energy, in the form of compressed air, to hydraulic energy to power a corresponding rear right brake 27 of a rear right wheel (not shown) fitted to an axle AXL2 with a conventional differential DF2.

Likewise, ABS modulator 25 regulates compressed-air supply to a corresponding pneumatic/hydraulic converter 28, which converts the incoming energy, in the form of compressed air, to hydraulic energy to power a corresponding rear left brake 29 of a rear left wheel (not shown) also fitted to axle AXL2.

A speed sensor SS3 and speed sensor SS4 are provided for determining the speed of the rear right wheel and rear left wheel respectively.

ABS modulators 24, 25 and rear-wheel speed sensors SS3, SS4 are also connected electrically to electronic central control unit CNT.

Between valve 16 and trailer brake assembly BTG (more specifically, between valve 16 and an adjustable coupling 31 forming part of assembly BTG) is interposed an electric valve 30, through which flows the adjustable low-pressure compressed air flowing along first branch RM1 of circuit C2 to assembly BTG.

Electric valve 30 is a normally-open type controlled by electronic central control unit CNT.

System 10 according to the present invention operates as follows:

(A) To simply brake the tractor and trailer (if any), the driver acts accordingly on pedal arrangement 14; compressed air, adjustable according to driver operation of pedal arrangement 14, is supplied simultaneously to the four ABS modulators 18, 19, 24, 25, thus initiating braking of all four wheels, which is regulated electronically by electronic central control unit CNT using ABS logic.

(B) To simply brake the tractor towing a trailer, electric valve 30 is open, and so permits adjustable-air flow from valve 16 to assembly BTG.

(C) Conversely, to implement the steer-by-braking function (SBF) using pedal arrangement 14, since nothing is gained—in fact, driver safety is even jeopardized—by also involving the trailer, electronic central control unit CNT closes electric valve 30 to cut off adjustable-air supply to assembly BTG.

(D) The four wheel speeds detected by sensors SS1, SS2, SS3, SS4 and transmitted to electronic central control unit CNT obviously also play their part in controlling both normal braking of the four wheels (with electric valve 30 open), and steer-by-braking (SBF) (with electric valve 30 closed) of either the rear right wheel by brake 27, or the rear left wheel by brake 29, depending on the desired turn direction.

Though the above description with reference to the attached drawing refers to a particular electronic system employing ABS logic, the teachings of the present invention also apply to any electronically controlled brake system, such as the brake-by-wire system.

Similarly, though the above description refers to a system comprising four ABS modulators, the teachings of the present invention may also be applied to three-channel systems (i.e. with two ABS modulators for the rear wheels, and one ABS modulator for both the front wheels), or even to two-channel systems (i.e. with only two ABS modulators for the rear wheels).

The system according to the present invention provides for the following functions:

(1) ABS electronic braking;
(2) Electronic steer-by-braking (e-SBF);

(3) Yaw moment control (YMC);

(4) Cornering brake control (CBC) for stabilizing and preventing the tractor from swerving when braking around bends; this control operates with no intervention on the part of the ABS system;

(5) Dynamic drift control (DDC) for stabilizing the vehicle when braking around bends, and preventing swerving during intervention of the ABS system; and (6) Electronic brake distribution (EBD) to avoid damaging the clutch.

The invention claimed is:

1. An electronically controlled brake system for trailer tractors; the system comprising:
    a compressed fluid source configured to produce and to distribute compressed fluid;
    a braking device for the tractor and trailer, wherein the braking device is configured to facilitate steer-by-braking of the tractor only;
    a compressed-fluid modulator configured to activate tractor brakes;
    a trailer braking device configured to brake the trailer only, wherein the trailer braking device comprises a normally-ON electric trailer braking valve normally facilitating simultaneous braking of the tractor and trailer;
    a pedal system having a left pedal and a right pedal, wherein the pedal system is configured to output first electrical signals indicative of depression of the left pedal and of the right pedal; and
    an electronic central control unit electrically coupled to the pedal system, to the compressed-fluid modulator, and to the electric trailer braking valve, wherein the electronic central control unit is configured to determine whether steer-by-braking is active based on the first electrical signals, and to output second electrical signals to the electric trailer braking valve while steer-by-braking is active, wherein the second signals are indicative of instructions to switch the electric trailer braking valve to OFF.

2. A system as claimed in claim 1, wherein the compressed-fluid modulator acts on a pneumatic/hydraulic converter that converts the incoming energy, in the form of compressed air, to hydraulic energy to power corresponding brakes.

3. A system as claimed in claim 1, wherein the electronic central control unit controls the compressed-fluid modulator.

4. A system as claimed in claim 1, wherein the electronic central control unit acquires and process third signals indicating the instantaneous speeds of the tractor wheels.

5. A system as claimed in claim 4, wherein the third signals indicating the instantaneous speeds of the tractor wheels are supplied by a number of sensors, each located at a respective wheel.

6. A system as claimed in claim 1, wherein the braking device and the compressed-fluid modulator form part of an ABS brake system.

7. A system as claimed in claim 1, wherein the braking device and the compressed-fluid modulator form part of a brake-by-wire system.

8. A system as claimed in claim 1, further comprising four ABS modulators.

9. A system as claimed in claim 1, further comprising three ABS modulators, wherein two ABS modulators are for the rear wheels, and one ABS modulator is for both the front wheels.

10. A system as claimed in claim 1, further comprising two ABS modulators for the rear wheels.

11. An electronically controlled brake system for trailer tractors, comprising:
    a pedal system having a left pedal and a right pedal, wherein the pedal system is configured to output first electrical signals indicative of depression of the left pedal and of the right pedal;
    an electric trailer braking valve configured to facilitate fluid flow between a tractor braking system and a trailer braking system while in an open position and to block fluid flow between the tractor braking system and the trailer braking system while in a closed position, wherein the tractor braking system is configured to brake the tractor and to facilitate steer-by-braking, the trailer braking system is configured to brake the trailer only, and fluid flow between the tractor braking system and the trailer braking system facilitates concurrent activation of the tractor braking system and the trailer braking system; and
    an electronic central control unit electrically coupled to the pedal system and to the electric trailer braking valve, wherein the electronic central control unit is configured to determine whether steer-by-braking is active based on the first electrical signals, and to output second electrical signals to the electric trailer braking valve while steer-by-braking is active, wherein the second electrical signals are indicative of instructions to transition the electric trailer braking valve to the closed position such that activation of the tractor braking system does not activate the trailer braking system.

12. The system of claim 11, wherein the tractor braking system comprises a compressed-fluid modulator electrically coupled to the electronic central control unit and configured to apply tractor brakes based at least in part on the first electrical signals.

13. A method for electronically controlling a brake system for trailer tractors, comprising:
    receiving first electrical signals from a pedal system having a left pedal and a right pedal, wherein the first electrical signals are indicative of depression of the left pedal and of the right pedal;
    determining whether steer-by-braking is active based on the first electrical signals; and
    outputting second electrical signals to an electric trailer braking valve while steer-by-braking is active, wherein the second signals are indicative of instructions to transition the electric trailer braking valve to a closed position;
    wherein the electric trailer braking valve is configured to facilitate fluid flow between a tractor braking system and a trailer braking system while in an open position and to block fluid flow between the tractor braking system and the trailer braking system while in the closed position, the tractor braking system is configured to brake the tractor and to facilitate steer-by-braking, the trailer braking system is configured to brake the trailer only, fluid flow between the tractor braking system and the trailer braking system facilitates concurrent activation of the tractor braking system and the trailer braking system, and blocked fluid flow between the tractor braking system and the trailer braking system disables trailer braking.

\* \* \* \* \*